United States Patent
Vesterinen et al.

(10) Patent No.: US 8,462,696 B2
(45) Date of Patent: Jun. 11, 2013

(54) METHOD, RADIO SYSTEM, MOBILE TERMINAL AND BASE STATION FOR PROVIDING LOCAL BREAKOUT SERVICE

(75) Inventors: Seppo Ilmari Vesterinen, Oulunsalo (FI); Mika Maurits Aalto, Espoo (FI); Sami Johannes Kekki, Helsinki (FI); Jukka Ilari Hongisto, Helsinki (FI)

(73) Assignee: Nokia Corporation, Espoo (FI)

( * ) Notice: Subject to any disclaimer, the term of this patent is extended or adjusted under 35 U.S.C. 154(b) by 621 days.

(21) Appl. No.: 12/595,758

(22) PCT Filed: Apr. 11, 2008

(86) PCT No.: PCT/FI2008/050179
§ 371 (c)(1),
(2), (4) Date: Jun. 15, 2010

(87) PCT Pub. No.: WO2008/125729
PCT Pub. Date: Oct. 23, 2008

(65) Prior Publication Data
US 2012/0269162 A1 Oct. 25, 2012

(30) Foreign Application Priority Data
Apr. 13, 2007 (FI) ..................................... 20075252

(51) Int. Cl.
*H04Q 7/00* (2006.01)
*H04L 12/28* (2006.01)

(52) U.S. Cl.
USPC ............ 370/328; 370/352; 370/389; 370/401

(58) Field of Classification Search
USPC .................................. 370/328, 389, 352, 401
See application file for complete search history.

(56) References Cited

U.S. PATENT DOCUMENTS

| 7,610,363 | B2 * | 10/2009 | Kim et al. ..................... 709/220 |
| 2004/0012116 | A1 | 1/2004 | Jurgens et al. |
| 2006/0174743 | A1 * | 8/2006 | Clemente ........................ 84/279 |
| 2007/0091862 | A1 * | 4/2007 | Ioannidis ..................... 370/338 |
| 2007/0133517 | A1 | 6/2007 | Miller |

(Continued)

FOREIGN PATENT DOCUMENTS

| GB | 2355624 | 4/2001 |
| GB | 2436665 | 10/2007 |
| WO | 2004082210 | 9/2004 |

OTHER PUBLICATIONS

Ericsson, Intra-PLMN Local Breakout, 3GPP TSG SA WG2 Architecture—S2#56, Jan. 15-19, 2007, pp. 1-5.

(Continued)

*Primary Examiner* — Andrew Lee
(74) *Attorney, Agent, or Firm* — Squire Sanders (US) LLP

(57) ABSTRACT

There is provided a radio system wherein a mobile terminal is configured to detect availability of a local breakout service to an Internet protocol gateway; to start a network entry to the local breakout service; and to configure an Internet protocol stack of the mobile terminal on the basis of received configuration data. A serving base station of the mobile terminal is configured to establish a radio bearer for the local breakout service; to provide a dynamic host control protocol relay function for mapping data of the mobile terminal using a local Internet protocol address to the established radio bearer; and to provide the local breakout service to the Internet protocol gateway while retaining user access control and a remote Internet protocol gateway of a packet core network of the public mobile network for the mobile terminal.

16 Claims, 5 Drawing Sheets

U.S. PATENT DOCUMENTS

| | | |
|---|---|---|
| 2007/0253359 A1 | 11/2007 | Hall |
| 2008/0107081 A1* | 5/2008 | Isobe et al. .................... 370/331 |
| 2008/0165740 A1* | 7/2008 | Bachmann et al. ........... 370/332 |
| 2008/0247361 A1* | 10/2008 | Jung et al. .................... 370/331 |
| 2009/0061877 A1* | 3/2009 | Gallagher et al. ............ 455/436 |
| 2009/0232099 A1* | 9/2009 | Maenpaa ...................... 370/332 |
| 2010/0178920 A1* | 7/2010 | Kitazoe et al. ................ 455/436 |

OTHER PUBLICATIONS

International Search Report and Written Opinion Received in the Corresponding PCT Application No. PCT/FI2007/050179 dated Jul. 15, 2008, p. 1-10.

* cited by examiner

METHOD, RADIO SYSTEM, MOBILE TERMINAL AND BASE STATION FOR PROVIDING LOCAL BREAKOUT SERVICE

RELATED APPLICATION

This application was originally filed as PCT Application No. PCT/FI2008/050179 on Apr. 11, 2008 and claims priority to Finnish Application No. 20075252 filed on Apr. 13, 2007, which is incorporated herein by reference in its entirety.

FIELD

The invention relates to a method for providing a local breakout service, to a radio system, to a base station, to a mobile terminal, and to a computer program distribution medium.

BACKGROUND

Cellular operators may nowadays offer a local IP (Internet Protocol) connectivity within a certain area (local IP breakout) without roaming, with limited user mobility and IP session continuation being an alternative to the ordinary cellular packet data services with roaming and global mobility support. Such local IP connectivity may be provided within a local zone in a city center or any limited geographical area, an enterprise network or a home where radio coverage is available. In minimum, this kind of local IP breakout can be provided using one radio cell/base station and it may be expanded to a wide radio coverage area in the operator's nation wide domain (PLMN). For example, LTE/SAE (Long Term Evolution/System Architecture Evolution) service with roaming, global/Inter Radio Access mobility with IP session continuation may be overlapping and may share the same cells/base stations that provide the local IP breakout service.

Network access to the ordinary cellular packet data services is enabled e.g. in LTE/SAE via the cellular operator's core network that provides global roaming and mobility support. Normally UE (User Equipment, Mobile terminal) is connected to the radio network, such as E-UTRAN (Enhanced universal terrestrial radio access network) in the LTE/SAE of this example, in a way that a SAE Gateway that is located in the core network provides an IP point of attachment to the UE. The selection of this gateway takes place during an Initial Attach procedure when the UE is also authenticated and authorized to use the network services. The SAE Gateway can be selected either from the visited PLMN (Public Mobile Network) or the UE's home PLMN, depending on the roaming agreement between the operators. If a SAE Gateway is selected from the visited PLMN, a "local breakout" with roaming is in question.

In order to enable more local IP breakout services, a public mobile network gateway element, such as a SAE Gateway element, is required e.g. in the customer premises, home, office, or otherwise the local traffic has to be routed all the way to a centralized public mobile network gateway in the operator's premises and then back to customer's infrastructure. One of the problems related to the known solutions is that the user data has to be traversed via the centralized public mobile network gateway, such as the SAE Gateway. Now non-optimal user data routing increases transfer delays in the transport network causing longer round trip time (RTT) for the user data correspondingly. Thus, for example, downloading times of Internet pages become longer as long RTT limits the data transfer speed of the TCP (transmission control protocol) protocol.

For example, in 3GPP, a "local breakout" has been understood as a U-plane Anchor selection from the visited PLMN rather than as a way of using a SAE Gateway from the home PLMN while roaming. In a known intra PLMN local breakout solution, route optimization is provided when the UE is moving far away from the current SAE Gateway. This is implemented by reselecting a new SAE Gateway when the UE moves to a new region and taking the new SAE Gateway and IP address to use after detecting inactivity in the old sessions and using new local IP address for new sessions. Full relocation to a new SAE Gateway occurs when all old sessions are terminated. This solution aims to provide an optimized IP routing by moving the SAE Gateway in the core network closer to the UE while it moves within the PLMN. However, solutions are needed where a more local IP breakout Gateway can be selected closer to the base stations for providing localized packet data services that could be used in parallel with the centralized packet data services in the public mobile networks. In this way the public mobile networks could also provide "local calls" instead of forcing all calls to be long distance calls.

BRIEF DESCRIPTION OF THE INVENTION

An object of the invention is to provide an improved method, a radio system, a base station, a mobile terminal, and a computer program distribution medium.

According to an aspect of the invention, there is provided a method, comprising: detecting availability of a local breakout service to an Internet protocol gateway for a mobile terminal in a public mobile network; starting a network entry of the mobile terminal to the local breakout service; and configuring an Internet protocol stack of the mobile terminal on the basis of received configuration data.

According to an aspect of the invention, there is provided a method, comprising: establishing a radio bearer for a local breakout service; providing a dynamic host control protocol relay function for mapping data of the mobile terminal using a local Internet protocol address to the established radio bearer; and providing the local breakout service to the Internet protocol gateway while retaining user access control and a remote Internet protocol gateway of a packet core network of the public mobile network for the mobile terminal.

According to another aspect of the invention, there is provided a radio system, comprising: one or more base stations of a public mobile network, at least one mobile terminal communicating with the one or more base stations, and a local breakout service network providing Internet protocol gateway services. The mobile terminal is configured to detect availability of a local breakout service to an Internet protocol gateway; to start a network entry to the local breakout service; and to configure an Internet protocol stack of the mobile terminal on the basis of received configuration data. A serving base station of the mobile terminal is configured to establish a radio bearer for the local breakout service; to provide a dynamic host control protocol relay function for mapping data of the mobile terminal using a local Internet protocol address to the established radio bearer; and to provide the local breakout service to the Internet protocol gateway while retaining user access control and a remote Internet protocol gateway of a packet core network of the public mobile network for the mobile terminal.

According to another aspect of the invention, there is provided a mobile terminal, comprising: a communication unit configured to communicate with one or more base stations of a public mobile network, and a processing unit for controlling the functions of the mobile terminal. The mobile terminal further comprises: a detection unit configured to detect availability of a local breakout service to an Internet protocol gateway; a processing unit configured to start a network entry to the local breakout service; and a configuration unit configured to configure an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal.

According to another aspect of the invention, there is provided a base station, comprising: a communication unit configured to communicate with at least one mobile terminal, and with a local breakout service network providing Internet protocol gateway services. The base station further comprises: a detection unit configured to receive a network entry request to the local breakout service from the at least one mobile terminal; a processing unit configured to establish a radio bearer for the local breakout service; a mapping unit configured to provide a dynamic host control protocol relay function for mapping data of the mobile terminal using a local Internet protocol address to the established radio bearer; and a processing unit configured to provide the local breakout service to the Internet protocol gateway while retaining user access control and a remote Internet protocol gateway of a packet core network of the public mobile network for the mobile terminal.

According to another aspect of the invention, there is provided a computer program distribution medium readable by a computer and encoding a computer program of instructions for executing a computer process, the process comprising: detecting availability of a local breakout service to an Internet protocol gateway for a mobile terminal in a public mobile network; starting a network entry of the mobile terminal to the local breakout service; and configuring an Internet protocol stack of the mobile terminal on the basis of received configuration data.

According to another aspect of the invention, there is provided a computer program distribution medium readable by a computer and encoding a computer program of instructions for executing a computer process, the process comprising: establishing a radio bearer for the local breakout service; providing a dynamic host control protocol relay function for mapping data of a mobile terminal using a local Internet protocol address to the established radio bearer; and providing the local breakout service to the Internet protocol gateway while retaining user access control and a remote Internet protocol gateway of a packet core network of the public mobile network for the mobile terminal.

According to another aspect of the invention, there is provided a mobile terminal, comprising: communication means for communicating with one or more base stations of a public mobile network, and processing means for controlling the functions of the mobile terminal. The mobile terminal further comprises: detection means for detecting availability of a local breakout service to an Internet protocol gateway; processing means for starting a network entry to the local breakout service; and configuration means for configuring an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal.

According to another aspect of the invention, there is provided a base station, comprising: communication means for communicating with at least one mobile terminal, and with a local breakout service network providing Internet protocol gateway services. The base station further comprises: detection means for receiving a network entry request to the local breakout service from the at least one mobile terminal; processing means for establishing a radio bearer for the local breakout service; mapping means for providing a dynamic host control protocol relay function for mapping data of the mobile terminal using a local Internet protocol address to the established radio bearer; and processing means for providing the local breakout service to the Internet protocol gateway while retaining user access control and a remote Internet protocol gateway of a packet core network of the public mobile network for the mobile terminal.

The invention provides several advantages. In an embodiment of the invention, a local breakout service is enabled with no the need to locate a public mobile network gateway nor to route the local traffic all the way to the public mobile network gateway in the operator's premises and then back to customer's infrastructure. A mobile terminal normally registered in a public mobile network may select a local IP connectivity (IP Point of Attachment) to an Intranet, or Internet services directly from the public mobile network cell/base station and the next hop Access Router, or any Access Router serving as a gateway to the local IP routing area.

Optimal user data routing is provided such that all data is not required to traverse via a centralized public mobile network gateway. Direct terminal-to-terminal communications, terminal-to-local services, and terminal-to-Internet become possible within the local breakout service area. Further, for example WLAN (wireless local area network) type services in the public mobile network are enabled without requiring multiple radios in the mobile terminals.

LIST OF DRAWINGS

In the following, the invention will be described in greater detail with reference to embodiments and the accompanying drawings, in which FIG. 1 shows an example of a radio system;

DESCRIPTION OF EMBODIMENTS

Figure 1:
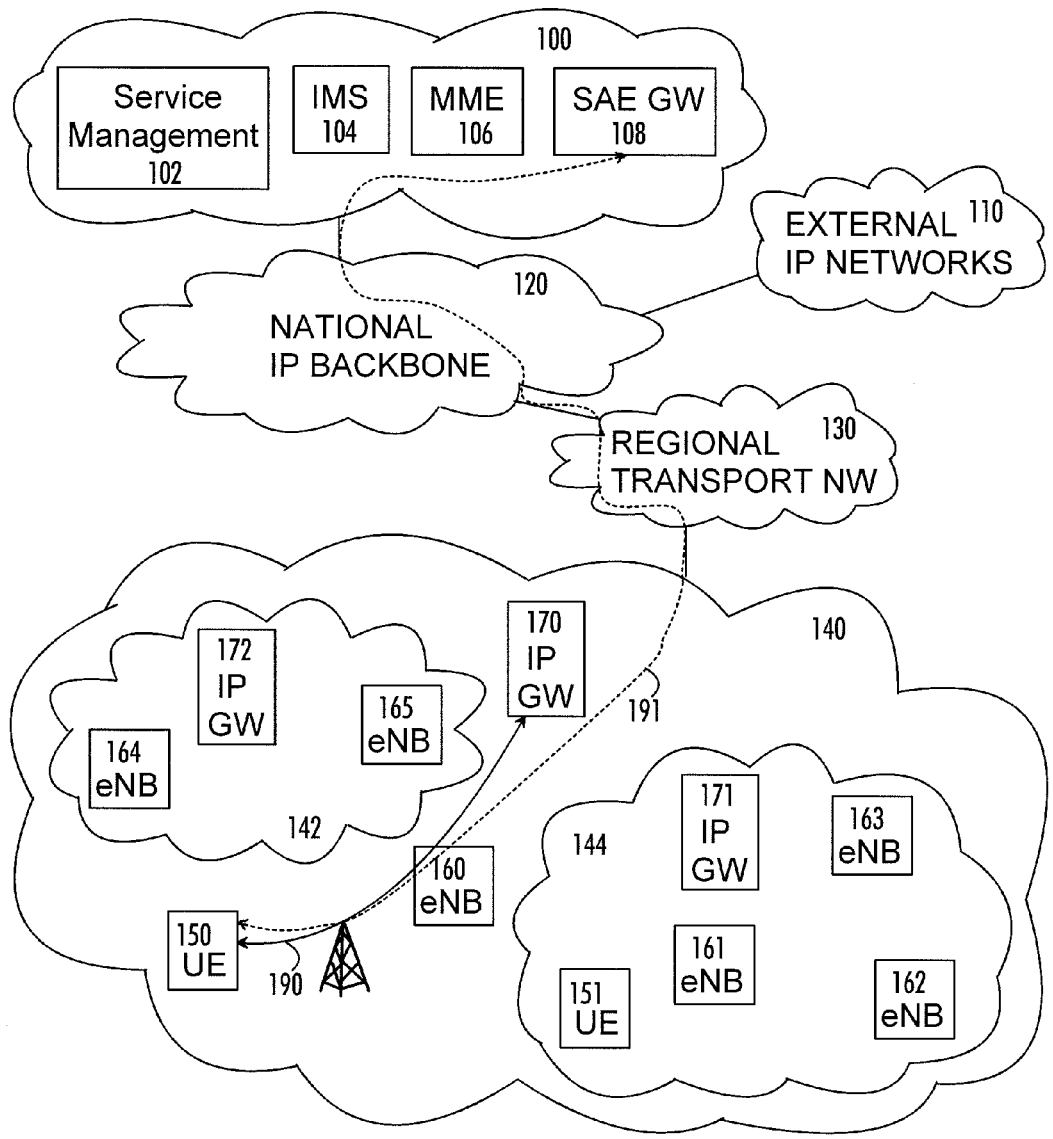

With reference to FIG. 1, examine an example of a radio system to which embodiments of the invention can be applied. In this example, the radio system is based on LTE/SAE (Long Term Evolution/System Architecture Evolution) network elements. However, the invention described in these examples is not limited to the LTE/SAE radio systems but can also be implemented in other radio systems, such as HSDPA (high speed downlink packet access), HSUPA (high speed uplink packet access), WIMAX (Worldwide Interoperability for Microwave Access), Internet HSPA, or in other suitable radio systems.

The exemplary radio system of FIG. 1 comprises a service core 100 of an operator including the following elements: a service management 102, IMS (IP multimedia subsystem) 104, an MME (Mobility Management Entity) 106, and an SAE GW (SAE Gateway) 108.

Traffic between mobile terminals 150, 151 and the service core network 100 is carried via a national IP backbone network 120, a regional transport network 130, and a local area aggregation network 140. eNBs (Enhanced node Bs) 160 to 165 of the radio system host the functions for Radio Resource Management: Radio Bearer Control, Radio Admission Control, Connection Mobility Control, Dynamic Resource Allocation (scheduling). The MME 106 is responsible for distributing paging messages to the eNBs 160 to 165.

Current radio networks are based on a single switch model. This is implemented in the LTE/SAE network by the SAE GW (SAE Gateway) 108. All calls/services are "long distance" due to forcing user traffic to pass via the SAE GW 108. For example, a connection from a mobile terminal 150 to an external IP networks 110, such as to the Internet 110, is typically guided via a route indicated with a dashed line 191. However, the embodiments of the invention now enable "local calls/services" also in the mobile networks.

In the following examples, embodiments according to the present invention for selecting and connecting to an ordinary IP Gateway 170 to 172 (Access Router) for a local IP breakout from a LTE base station 160 to 165 while retaining user access control and SAE GW 108 in the LTE/SAE operator's packet core network 100 are described. It is assumed that the registration to the default SAE Bearer services using an IP address from the SAE GW 108 is available, even if not necessarily used for active sessions. In an embodiment, local breakout services providing Internet protocol gateway services can be provided via local IP gateways 170 to 172. The IP gateways 170 to 172 may reside, for example, in a corporate network 144 or in a specific local area 142, such as a city area. This provides optimal data routing such that all data is not required to traverse via the centralized SAE GW 108. For example, a solid line 190 illustrates how the local breakout service is provided for a mobile terminal 150. This way, direct terminal-to-terminal communications (e.g. between 150 and 151), terminal-to-local services and terminal to Internet become possible within the local breakout service area.

A mobile terminal 150, 151 in a local area network 140 is configured to detect availability of a local breakout service to an Internet protocol gateway;
to start a network entry to the local breakout service; and to configure an Internet protocol stack of the mobile terminal on the basis of received configuration data. The serving base station 160, 161 of the mobile terminal is configured to establish a radio bearer for the local breakout service; to provide a dynamic host control protocol relay function for mapping data of the mobile terminal using a local Internet protocol address to the established radio bearer; and to provide the local breakout service to the Internet protocol gateway 170, 171, 172 while retaining user access control and a remote Internet protocol gateway of a packet core network 100 of the public mobile network for the mobile terminal 150, 151.

In an embodiment, the availability of the local breakout service via the mobile terminal's 150, 151 current LTE Cell/Base Station 160 to 165 could be indicated to the mobile terminal 150, 151 by one of the following means: advertisements in LTE Cell System Information from the base station (configured into LTE Cell/Base Station Radio Network Configuration data), indicating the local breakout service availability to the mobile terminal 150, 151 in NAS (Non-Access-Stratum) signaling when the mobile terminal 150, 151 has moved to a service coverage area, e.g. as part of a Tracking Area Update procedure, Idle to Active State transition, or inter LTE Base Station Handover (location based service triggered from the Evolved Packet Core), the mobile terminal 150, 151 itself may detect movement to an LTE Cell in which Cell Id, Tracking Area Id and Network Id match local IP breakout service related information stored in non-volatile memory of the mobile terminal, or a user intervention from application level when the end-user is e.g. at the office (manual registration into an Enterprise Network).

When the User/mobile terminal 150, 151 has received the indication about service availability, the network entry procedure to a local IP breakout service may be started automatically from the mobile terminal 150, 151, or manually by an end-user intervention.

The scope of IP connectivity via the local IP breakout service may be anything from one LTE Cell/Base Station 160 to 165 to a Tracking Area that is formed from multiple neighboring LTE Cells/Base Stations covering the following cases: Direct connectivity to Internet from a home LTE Cell/Base Station like using WLAN Access Point and DSL modem (could be the nearest LTE Cell at home, not necessarily inside the house, e.g., a designated cell in the neighborhood); An Enterprise Network providing Intranet connectivity to local services and a direct connectivity to the Internet via the Enterprise Gateway. "Pico" LTE Base Stations could be applied for improving indoor coverage in corporate premises that with nearby public LTE Cells/Base Stations form a local breakout Tracking Area in which Cells may be shared with LTE/SAE users using SAE GW services; A local zone (e.g. shopping centre, city area etc.) comprising multiple Cells/Base Stations forming a Tracking Area that is shared by LTE/SAE users and local IP breakout users.

In order to provide mobility within the local IP breakout area, the network must inform the mobile terminal 150, 151 about neighboring LTE Cells in which the local IP breakout service may continue. The Network can indicate the list of neighboring Cells and Tracking Area Id in conjunction with an Initial Attach procedure, Network Entry to local breakout service, or in ordinary hand-over related measurement control from the LTE Base Station to the mobile terminal. Whether or not the local service area, i.e., the area where a local breakout service is available, is continuous within a geographical area is a matter of network planning by the operator.

The authentication into the LTE/SAE network can be trusted only for cases where the LTE/SAE operator provides the IP Gateway 170 to 172 for the local IP breakout service. In the Enterprise Network solutions the user/mobile terminal must be authenticated and authorized separately in order to enable user-plane connection to the Enterprise Intranet. The LTE Base Stations 160 to 165 may support UE authentication to Enterprise Network Authentication Server e.g. by using RADIUS when required. The required static information/settings for this feature in the LTE Base station could be included in the Base Station configuration data and the dynamic user/UE specific information could be received from the Core Network (e.g. from the MME node).

For security reasons the LTE Base Station 160 to 165 may allow the mobile terminal 150, 151 to transfer initially only authentication related messages to the local Authentication Server and direct user-plane connectivity to a local access network is to be enabled only for authenticated users. The LTE Base Station 160-165 is to set up a separate Radio Bearer for the local IP breakout service in order to differentiate user data from the default SAE Bearer that is to be tunneled to the SAE GW 108.

In its simplest form the direct user-plane connectivity could be enabled from the LTE Base Station 160 to 165 to a local access network based on User/UE User Context data that is received from the LTE/SAE Core Network (e.g. from the MME node). This data may contain subscriber specific information indicating that the local IP breakout service is allowed. However, if authentication into LTE/SAE network is considered sufficient also for the local IP breakout service, the LTE Base Station 160 to 165 may set up the required radio bearer on the user plane automatically, i.e. additional authentication may be skipped.

The required Radio Bearer may be set up autonomously in control of the Base Station 160-165, or by using UE requested PDN connectivity procedure when the Base Station 160-165 receives a specific Bearer Setup Request from the Core Network (e.g. from the MME node).

If additional authentication to the local IP breakout service is required locally, the LTE Base Station 160 to 165 is to initially allow only transmission of authentication related messages in "direct transfer" messages over the control plane interface. Now the required radio bearer on the user plane is to be set up only after successful authentication.

The LTE Base Station 160 to 165 may serve as an Authentication Relay towards the local Authentication Server, or serves itself as a local Authenticator. In the latter case, the required subscriber specific identifiers and security data (e.g. user name and password) should be available in the LTE Base station e.g. in the user context received from the Core Network.

The mobile terminal 150,151 may receive an IP address for the local IP breakout service with authentication related signaling. If the authentication procedure does not support IP address assignment, the mobile terminal 150, 151 must obtain the local IP address e.g. by using a DHCP protocol over the newly established Radio Bearer. The LTE Base Station 160 to 165 provides a DHCP Relay function in order to forward DHCP related messages to/from a local DHCP Server and to be able to read received IP configuration data that is required for mapping the user data using the local IP address to the Radio Bearer (requires IP lookup in LTE Base Station).

An alternative method for triggering the radio bearer setup for the local breakout service in the LTE Base Station 160 to 165 could be detecting the DHCP Discovery message that is either encapsulated into a control plane message (RRC protocol), or transferred over the existing SAE Bearer on the user plane. The latter requires IP lookup in the LTE Base Station 160-165 also for the SAE Bearer IP packets in the uplink direction.

Once the mobile terminal 150, 151 has configured its IP stack (either based on received configuration data in authentication, or using DHCP), the Radio Bearer for local breakout is set up, and the LTE Base Station 160 to 165 has configured its network interface to route the local user data, the Network Entry procedure to the Local IP breakout service is completed and local IP connectivity is available for transferring user data.

Figure 2:
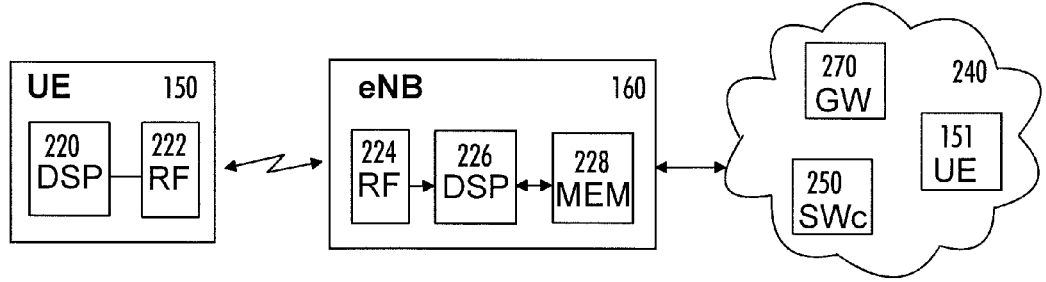
FIG. 2 illustrates an example of a mobile terminal, a base station, and an IP subnet.

FIG. 2 illustrates an example of a mobile terminal, a base station, and an IP subnet. The mobile terminal 150 comprises a communication unit 222 configured to communicate with one or more base stations 160 of a public mobile network, and a processing unit 220 for controlling the functions of the mobile terminal. The processing unit 220 is typically implemented with a microprocessor, a signal processor or separate components and associated software. The mobile terminal 150 further comprises (e.g. in the processing unit 220): a detection unit configured to detect availability of a local breakout service to an Internet protocol gateway 270; a processing unit configured to start a network entry to the local breakout service; and a configuration unit configured to configure an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal.

The base station 160 of a public mobile network comprises: a communication unit 224 configured to communicate with at least one mobile terminal 150, and with a local breakout service network 240 providing Internet protocol gateway services. The base station further comprises: a detection unit configured to receive a network entry request to the local breakout service from the at least one mobile terminal 150; a processing unit configured to establish a radio bearer for the local breakout service; a mapping unit configured to provide a dynamic host control protocol relay function for mapping data of the mobile terminal using a local Internet protocol address to the established radio bearer; and a processing unit configured to provide the local breakout service to the Internet protocol gateway while retaining user access control and a remote Internet protocol gateway of a packet core network of the public mobile network for the mobile terminal. The processing unit 226 is typically implemented with a microprocessor, a signal processor or separate components and associated software. The base station 160 may also include a memory 228 and other elements.

The local breakout service can be provided, for example, to a local network 240 that enables direct UE-to-UE (between 150 and 151) communications, UE-to-local servers and an Internet connection (direct routing). The local network 240 can be, for example, an enterprise network, a shopping centre, a city centre, a gaming zone, municipal services, a base station sharing with a local operator, a home cell (nearby the base station), an indoor "Femto eNB" at home. The mobile terminal 150 is able to use a local IP address for direct IP connectivity from the base stations to the Internet, enterprise networks, regional or direct UE to UE services. No cellular operator owned special Gateway nodes are required in $3^{rd}$ party premises. Existing packet switched transport equipment, such as IP Routers and LAN Switches 250 and IETF compliant Servers, can be applicable.

In an embodiment, a local DHCP server can be used to assign a local IP address for the mobile terminal 150. The base station 160 may itself serve as the next hop router to the mobile terminal, or use the router next to the base station 160, or an IP Gateway behind multiple router hops. Further, inter-base station mobility within the local breakout service coverage area can be supported without changing the local IP address.

Figure 3:
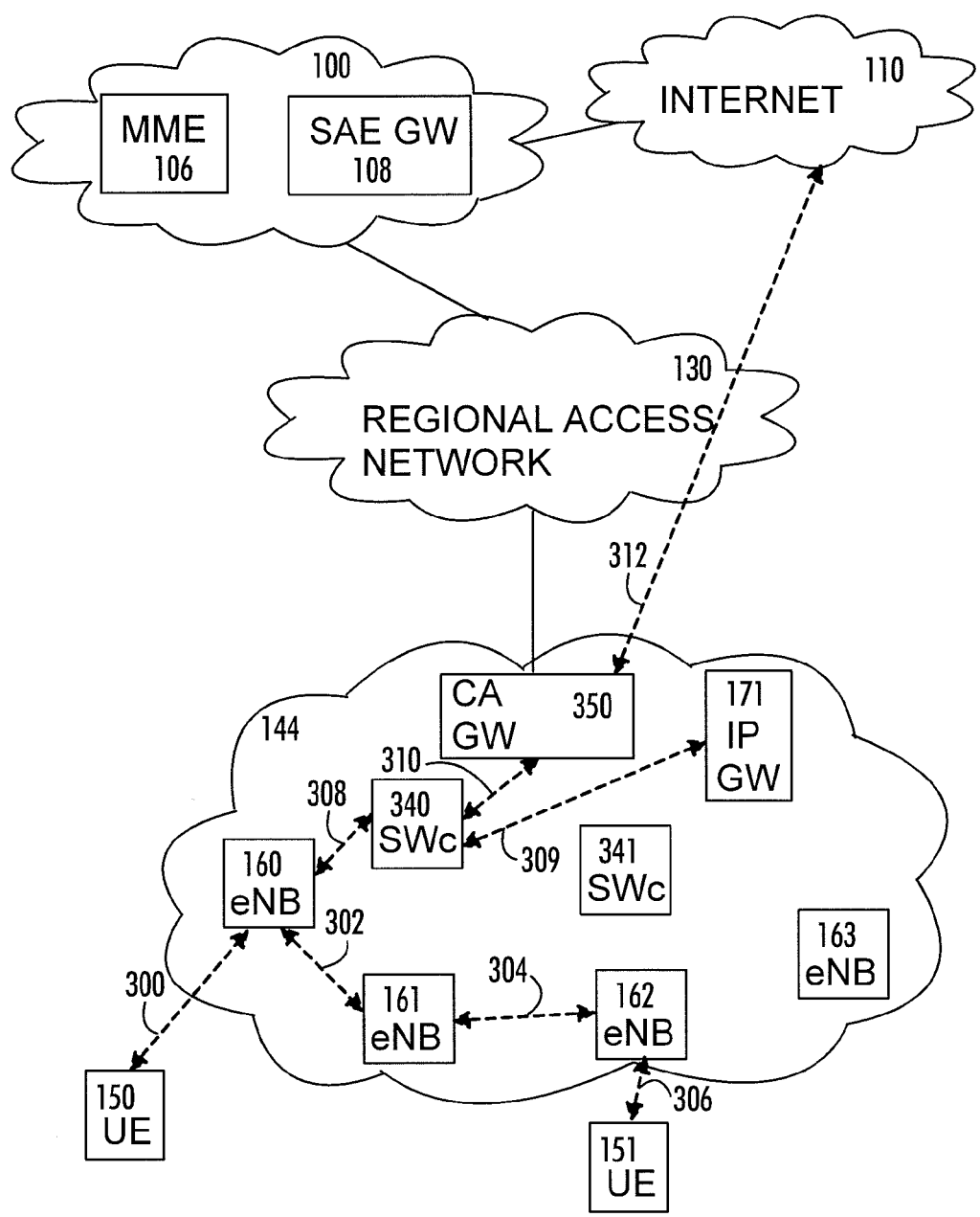
FIG. 3 shows another example of a radio system.

FIG. 3 shows another example of a radio system according to an embodiment. A service core 100 of an operator includes at least an MME 106 and an SAE GW 108. For example, connections from a mobile terminal 150 to External IP networks 110, such as the Internet, can be provided via the SAE GW 108 or directly via a local gateway 350, such as a corporate access GW of a corporate IP subnet 144. This route is illustrated with dashed lines 300, 308, 310 and 312 via a base station 160, a switch element 340, 341 (e.g. L2 switch), and a corporate access GW 350.

In the example of FIG. 3, the mobile terminal 150 is allowed to obtain direct IP connectivity from base stations 160, 161, 162, 163 to enterprise networks, regional or direct UE to UE services. For example, direct UE to UE connection between the mobile terminal 150 and mobile terminal 151 is illustrated by dashed lines 300, 302, 304, 306 where the route passes via the base stations 160, 161, 162 without the need to go all the way to the SAE GW 108 and back. A flat E-UTRAN architecture with all radio functions in an "IP aware" base station enables local IP connectivity without any involvement of the SAE GW 108, e.g. see the route illustrated by dashed lines 300, 308, 309 from the mobile terminal 150 to the IP Gateway 171. The radio capacity can be shared from macro layer LTE base stations and the service coverage can be expanded to indoors and anywhere with low cost "Femto" LTE Access Points, for example.

In an embodiment, the mobile terminal 150 is able to switch back to standard LTE/SAE Core Network services anytime, as it is assumed that the Core Network 100 is to maintain User Registration, Location Tracking, State Management and default SAE Bearer service as usual. For an Enterprise Network solution, no other LTE specific nodes are needed in addition to the LTE Base Station(s) as e.g. an ordinary and existing Corporate Gateway can be used to provide the local IP connectivity. For example, a WLAN solution requires a WLAN Switch in order to connect/manage multiple WLAN Access Points and to support handovers between these. Further, WLAN type services can be enabled in LTE/SAE without requiring multiple radios in terminals. If the cellular operator provides the local breakout with LTE radio, the end-user does not need to authenticate separately with username/passwords, as is the case with fragmented WLAN hotspot services.

Figure 4:
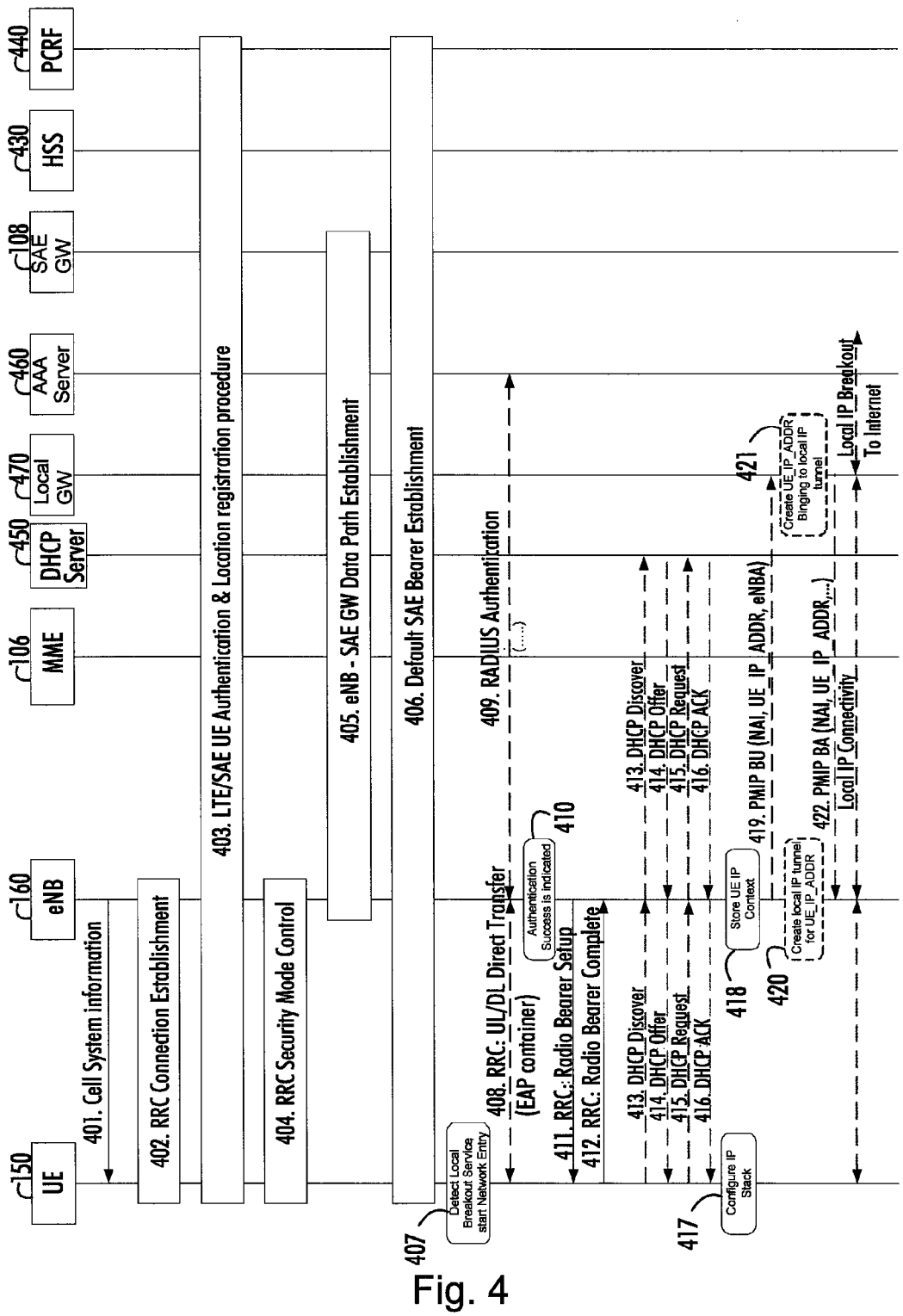
FIG. 4 is a signal sequence diagram illustrating an example of a method of providing a local breakout service.
Figure 6:
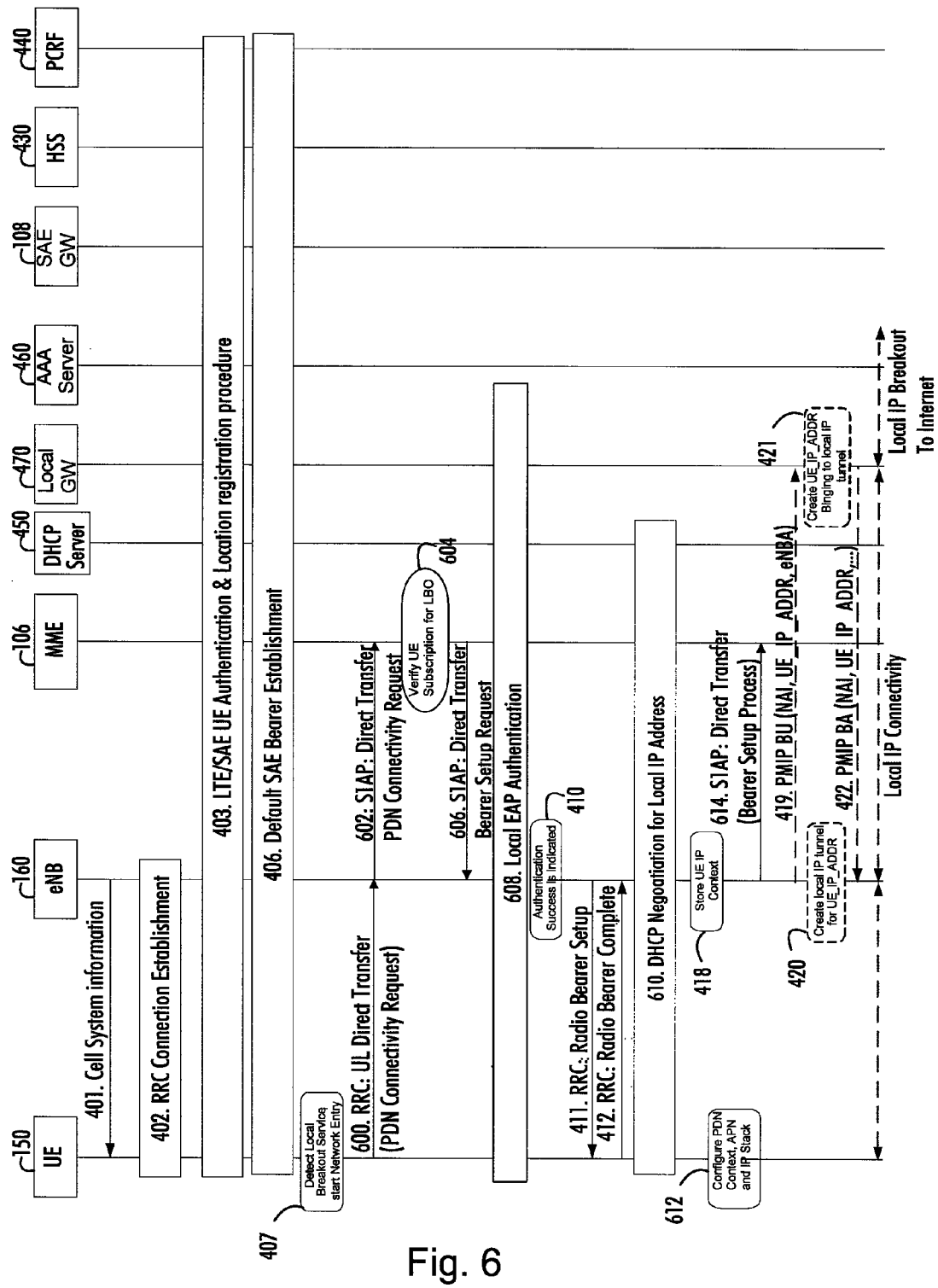
FIG. 6 is a signal sequence diagram illustrating an example of a method of providing a local breakout service.

FIGS. 4 and 6 are signal sequence diagrams illustrating example methods of providing a local breakout service. FIG. 4 shows a method for providing a local breakout service utilizing autonomous Radio Bearer set up in control of the Base Station. FIG. 6, on the other hand, illustrates a local breakout service initiated by requesting a PDN (packet data network) connectivity by the user equipment 150.

FIG. 4 is a signal sequence diagram illustrating an example of a method of providing a local breakout service. The functions indicated with dashed lines are optional. A detailed signaling flow for a UE Network Entry procedure to the local IP breakout service in an LTE/SAE network is described. FIG. 4 also contains a UE Initial Attach procedure to LTE/SAE Network after which the mobile terminal 150 is able to continue with the UE Network Entry procedure to a local IP breakout service. If the mobile terminal 150 is already registered in the LTE/SAE network, UE authentication can be omitted and the UE Network Entry procedure to local IP breakout service may start immediately after the mobile terminal 150 is connected to an LTE Cell and SAE Bearer related configurations are completed.

In 401, Cell System information is received in the mobile terminal 150 from a serving base station 160 of a public mobile network. The LTE base station 160 transmits periodically Cell System Information data on a broadcast channel in order to advertise LTE radio coverage availability, network identifiers and physical properties of the radio link. Based on the received system information, the mobile terminal 150 is able to select an LTE/SAE operator and LTE Cell with the best signal quality over a radio interface a) after the mobile terminal power has been switched on, or b) upon entering a new LTE/SAE network, or c) after having moved from LTE_IDLE (power saving) state back to LTE_ACTIVE state. The Cell System Information may contain Information Elements that advertise the availability of a local IP breakout service (pre-configured in eNodeB in its Radio Network Configuration Data).

In 402, RRC (Radio Resource Control) Connection Establishment is carried out between the mobile station 150 and the base station 160. After selecting the LTE Cell, the mobile terminal 150 is to establish radio link connectivity with the base station 160 on the control-plane by using an LTE standard RRC Connection Establishment Procedure.

In 403, LTE/SAE UE Authentication and Location registration procedure is carried out. If the mobile terminal 150 has not yet registered in the LTE/SAE network e.g. after switching power on, or after entering a new LTE/SAE network (radio coverage lost to previous network), the authentication and location registration procedure must be executed to the network according to an LTE/SAE standard procedure. If the mobile terminal 150 is already registered in the current LTE/SAE network, User Context data is to be available in the MME (Mobility Management Entity) 106 and the required portion of it can be retrieved to the base station 160 without re-authentication e.g. after the mobile terminal 150 has moved from LTE_IDLE (power saving) state to back to LTE_ACTIVE state. The mobile station 150 performs authentication using ordinary LTE/SAE initial Access towards the MME (Mobility Manage Entity) 106 and obtains tunneled IP connectivity via SAE GW 108 as usual. An AAA (authentication, authorization, and accounting) Server 460 provides an interface between the devices and security servers through which access control can be set up. A HSS server 430 provides the functions of the home location register (HLR) and the functions of the user mobility server (UMS), and a PCRF (Policy & Charging Rules Function) 440 uses knowledge of available resources and customer profile to the authorization of the session.

In 404, RRC Security Mode Control is provided between the mobile terminal 150 and the base station 160. The LTE/SAE standard Security Mode Control Procedure is to be executed after the authentication procedure in order to start user data ciphering over the radio interface. In 405, SAE Gateway Data Path Establishment is carried out between the base station 160 and the SAE GW 108. The network is to establish the required user-plane tunnels to be used for the default SAE Bearer Services via the SAE GW 108.

In 406, default SAE Bearer Establishment is carried out for the mobile terminal 150. The network is to set up the default SAE Bearer service in the SAE GW 108, base station 160, and mobile terminal 150. From now on, the mobile terminal 150 has the default IP connectivity via the SAE GW 108 on the user-plane. At this moment, the mobile terminal 150 may detect that a local IP breakout service is available on the basis of a) received information in the Cell System Information b) NAS level signaling received from MME either during authentication procedure, or pushed location based service information c) stored Cell Id, Tracking Area and Network Id information in the UE d) End-user intervention from application level. After being authenticated and registered with the MME 106, the mobile terminal 150 may assign a local IP address for a local breakout from an IP Gateway 470 by using its DHCP client.

In 407, the availability of a local breakout service is detected in the mobile terminal 150, and a Network Entry process is started. In 408, radio resource control related uplink/downlink Direct Transfer can be carried out between the mobile terminal 150 and the base station 160. If the local IP breakout service requires separate authentication, in 409, the mobile terminal 150 must perform an authentication procedure to a local AAA Server 460 via the base station 160 that provides e.g. a RADIUS client. For example, EAP (Extensive Authentication Protocol) messages are to be carried over RRC direct transfer messages over the radio link control plane and the eNode encapsulates/decapsulates EAP containers in RADIUS protocol messages to/from the local AAA Server 460. This local authentication can be omitted if the authentication to the ordinary LTE/SAE network services is trusted also for the local breakout service. In 410, successful authentication is indicated in the base station 160.

After successful authentication the base station 160 is to set up a required user context and a Radio Bearer for the local IP breakout service that differentiates user data traffic from the ordinary LTE/SAE bearer service. In 411, the Radio Bearer for the local breakout service is established for the mobile terminal 150. In 412, the mobile terminal 150 responds according to LTE standard with a Radio Bearer Complete message. From now on, the user-plane connectivity for the local IP breakout service is available over the radio link.

If the mobile terminal 150 has not received an IP address for the local IP breakout service during the local authentication procedure, it must obtain an IP address using a DHCP protocol. DHCP messages are to be transmitted as user-plane data over the newly established radio bearer. The base station 160 provides a DHCP relay service in order to forward the DHCP messages to a local DHCP Server 450. In 413, the first DHCP message from the mobile terminal 150 is to be DHCP Discovery, according to an IETF standard procedure. In 414, the local AAA Server 460 responds to the mobile terminal 150 with a DHCP Offer message containing an IP Address. The base station 160 must store the carried information in the user context data. In 415, the mobile terminal 150 sends a DHCP Request to the AAA Server 460 indicating that it will take the offered IP address to use. In 416, the AAA Server 460 responds the mobile terminal 150 with a DHCP Ack indicating that IP address lease is confirmed. The base station 160 must ensure that the DHCP procedure is performed correctly and completed in order to finalize storing the User IP Context Data for the local IP breakout service.

In 417, the mobile terminal 150 configures its IP stack either on the basis of received configuration data in authentication, or using DHCP. In 418, the base station 160 stores the IP context of the mobile terminal 150. Once the mobile terminal 150 has configured its IP stack, the radio bearer for the local breakout service has been set up and the base station has configured its network interface to route the local user data, the Network Entry process to the local IP breakout service is completed and the local IP connectivity is available for transferring user data.

If the IP Gateway for the local IP breakout service resides higher in the IP network topology behind multiple router hops, the base station 160 must establish a local IP tunnel e.g. using a Proxy Mobile IP (PMIP) protocol. If the local IP Gateway is the base station's next hop router (the local breakout router is either the eNodeB itself, or an external IP Router to which the base station connects via an L2 switched network, e.g. Ethernet LAN) this step can be omitted as the user data need not be tunneled at all (the mobile terminal's IP address is assigned from the topologically correct IP subnet, so ordinary IP routing works). This is illustrated in 419 to 422. In 419 and 422, a standard PMIPv6 Routing Control Protocol related messages are exchanged between the local GW 470 and the base station 160. In 420, the base station creates a local IP tunnel for UE_IP_ADDR, and UE_IP_ADDR Binging to local IP tunnel is created in the local GW 470 in 421. In 422, a local IP Gateway that supports PMIP responds with a PMIP Binding Acknowledge message. From now on, the user plane IP connectivity is available for the local IP breakout service also when local tunneling must be used over multiple router hops.

The fastest entry to an LTE Cell occurs in Inter-eNodeB-handovers when the source (old) eNB transfers the user context to the target (new) eNodeB during a handover preparation phase. Once the mobile terminal has obtained radio link connectivity in the target Cell/eNodeB, a user plane tunnel is to be switched to SAE GW and an SAE bearer service is set up automatically on the basis of received user context data. If the mobile terminal enters a local IP breakout service coverage area as a result of an inter eNodeB handover, steps 401 to 406 in the previous signaling flow of FIG. 4 are to be replaced with a standard Inter eNodeB handover procedure, after which the mobile terminal detects the availability of a local IP breakout and proceeds to steps 407 to 422 as explained above.

In another embodiment of the invention, illustrated in FIG. 6, the local IP breakout service may be initiated by requesting a PDN (packet data network) connectivity by the user equipment 150. There are differences between the procedures shown in FIGS. 4 and 6. However, most of the procedure shown in FIG. 6 is similar to that of FIG. 4 and, hence, only the functions that are different in FIG. 6 are described here. In step 600, radio resource control related uplink direct transfer related to the PDN connectivity request may be carried out between the user equipment 150 and the base station 160.

In step 602, the base station 160 may process and transmit the PDN connectivity request to the MME 106 over NAS signaling. This way the MME 106 is able to verify the user subscription for local breakout services in step 604 before issuing the SAE bearer setup request 606 to the base station 160. Thus, the PDN connectivity request by the UE 150 triggers the base station 160 to setup a radio bearer for supporting a new local IP breakout service directly from the base station 160.

Thus, the base station 160 may proceed in its radio bearer setup as usual. The only difference might be that the PDN GW for the SAE bearer may be associated with the base station 160. In other words, the APN (access point identifier) request from the UE 150 refers to the base station itself, where the PDN SAE GW is virtually located. SAE is also known as evolved packet system (EPS) in the specifications of the LTE.

The user equipment authentication 608 in to the evolved packet core may happen locally if the localized services are provided fully by the LTE operator. In other cases, the user equipment 150 may be authenticated and authorized separately before enabling direct user plane access to the intranet/internet.

The local IP address may be obtained in authentication related signaling. However, if the user equipment 150 does not receive IP address over authentication, the user equipment 150 may obtain it from a local DHCP server through a DHCP negotiation for local IP address 610. This step includes steps 413 to 416 of FIG. 4.

After the user equipment 150 has configured its PDN, access point identifier and the IP stack in step 612, the base station 160 may proceed in the setup of the radio bearer for local breakout services 614 and in the configuration of the access network interface to route the local user data.

Otherwise the procedure illustrated in FIG. 6 for providing local breakout service is the same as in FIG. 4. For example, step 608 may be omitted if the authentication is not required. The steps 602, 604 and 614 are standard LTE messages in the user equipment requested PDN connectivity procedure.

Figure 5:
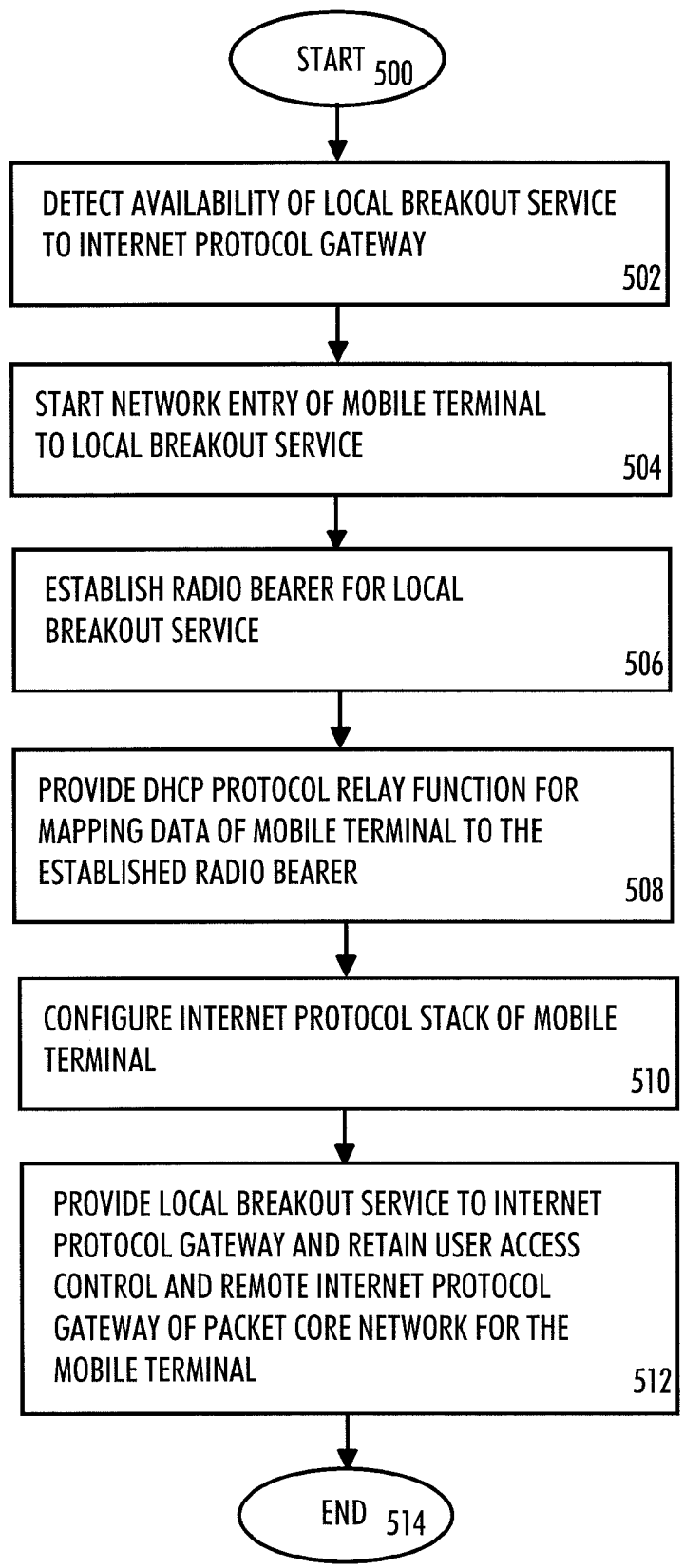
FIG. 5 shows an example of a method according to an embodiment of the invention.

FIG. 5 shows an example of a method according to an embodiment of the invention. The method starts in 500. In 502, availability of a local breakout service to an Internet protocol gateway for a mobile terminal in a public mobile network is detected. In 504, a network entry of the mobile terminal to the local breakout service is started. In 506, a radio bearer for the local break-out service is established.

In 508, a dynamic host control protocol relay function is provided for mapping data of the mobile terminal using a local Internet protocol address to the established radio bearer. In 510, an Internet protocol stack of the mobile terminal is configured on the basis of received configuration data. In 512, the local breakout service to the Internet protocol gateway is provided while retaining user access control and a remote Internet protocol gateway of a packet core network of the public mobile network for the mobile terminal. The method ends in 514.

The embodiments of the invention may be realized in an electronic device comprising a controller. The controller may be configured to perform at least some of the steps described in connection with the flowchart of FIG. 5 and in connection with FIGS. 1 to 4 and 6. The embodiments may be implemented as a computer program comprising instructions for executing a computer process. The computer process comprises: detecting availability of a local breakout service to an Internet protocol gateway for a mobile terminal in a public mobile network; starting a network entry of the mobile terminal to the local breakout service; establishing a radio bearer for the local breakout service; providing a dynamic host control protocol relay function for mapping data of the mobile terminal using a local Internet protocol address to the established radio bearer; configuring an Internet protocol stack of the mobile terminal on the basis of received configuration data; and providing the local breakout service to the Internet protocol gateway while retaining user access control and a remote Internet protocol gateway of a packet core network of the public mobile network for the mobile terminal.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
   detecting availability of a local breakout service to an Internet protocol gateway for a mobile terminal in a public mobile network;
   starting a network entry of the mobile terminal to the local breakout service;
   configuring an Internet protocol stack of the mobile terminal on the basis of received configuration data; and
   wherein the local breakout service comprises selection of the Internet protocol gateway from a local network.

2. The method of claim 1, further comprising: detecting the local breakout service availability via a serving base station of the mobile terminal by means of at least one of: an advertisement in cell system information, Non-Access-Stratum (NAS) signaling.

3. The method of claim 1, further comprising:
   detecting, by the mobile terminal, the local breakout service availability by detecting movement to a radio cell in which Cell Id, Tracking Area Id and Network Id match stored local Internet protocol breakout service related information.

4. The method of claim 1, further comprising:
   starting the network entry of the mobile terminal to the local breakout service by sending a packet data network connectivity request to a core network using non-access-stratum signaling.

5. The method of claim 4, further comprising:
   triggering an establishment of a radio bearer for a local breakout service at the serving base station by sending the packet data network connectivity request to the core network.

6. The method of claim 1, further comprising receiving information about neighboring base station cells in which the local Internet protocol breakout service can continue in order to provide mobility within a local Internet protocol breakout area.

7. A method comprising:
   establishing a radio bearer for a local breakout service;
   providing a dynamic host control protocol relay function for mapping data of a mobile terminal using a local Internet protocol address to the established radio bearer;
   providing the local breakout service to an Internet protocol gateway while retaining user access control and a remote Internet protocol gateway of a packet core network of a public mobile network for the mobile terminal; and
   wherein the local breakout service comprises selection of the Internet protocol gateway from a local network.

8. The method of claim 7, further comprising: supporting the local breakout service directly from the serving base station after being triggered to establish the radio bearer for the local breakout service by the mobile terminal sending a packet data network connectivity request to a core network.

9. The method of claim 7, further comprising: providing the local breakout service from a public mobile network base station to a tracking area including multiple neighboring base stations.

10. The method of claim 9, further comprising: providing the local breakout service to at least one of the following services: direct connectivity to the Internet via the Internet protocol gateway from a home base station, an enterprise network providing Intranet connectivity to local services and/or direct connectivity to the Internet via an enterprise gateway, a local zone including multiple base stations forming a tracking area shared by mobile terminals of the public mobile network and local Internet protocol breakout user terminals.

11. A mobile terminal comprising:
    a communication unit configured to communicate with one or more base stations of a public mobile network;
    a processing unit configured to control functions of the mobile terminal;
    a detection unit configured to detect availability of a local breakout service to an Internet protocol gateway;
    a processing unit configured to start a network entry to the local breakout service;
    a configuration unit configured to configure an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal; and
    wherein the local breakout service comprises selection of the Internet protocol gateway from a local network.

12. The mobile terminal of claim 11, wherein the detection unit is configured to detect the local breakout service availability via a serving base station of the mobile terminal by means of at least one of: an advertisement in cell system information, Non-Access-Stratum (NAS) signaling.

13. The mobile terminal of claim 11, wherein the detection unit is configured to detect the local breakout service availability by detecting movement to a radio cell in which Cell Id, Tracking Area Id and Network Id match stored local Internet protocol breakout service related information.

14. The mobile terminal of claim 11, wherein the processing unit is further configured to:
   start the network entry of the mobile terminal to the local breakout service by sending a packet data network connectivity request to a core network using non-access-stratum signaling.

15. A base station, comprising:
   a communication unit configured to communicate with at least one mobile terminal, and with a local breakout service network providing Internet protocol gateway services;
   a detection unit configured to receive a network entry request to the local breakout service from the at least one mobile terminal;
   a processing unit configured to establish a radio bearer for the local breakout service;
   a mapping unit configured to provide a dynamic host control protocol relay function for mapping data of the mobile terminal using a local Internet protocol address to the established radio bearer;
   a processing unit configured to provide the local breakout service to the Internet protocol gateway while retaining user access control and a remote Internet protocol gateway of a packet core network of the public mobile network for the mobile terminal; and
   wherein the local breakout service comprises selection of the Internet protocol gateway from a local network.

16. The base station of claim 15, wherein the processing unit is further configured to: support the local breakout service directly from the serving base station after being triggered to establish the radio bearer for the local breakout service by the mobile terminal sending a packet data network connectivity request to a node on a core network.

* * * * *